United States Patent
Yu (10) Patent No.: US 10,686,531 B1
(45) Date of Patent: Jun. 16, 2020

(54) MONITORING AND CORRECTING I/Q IMBALANCE IN HIGH-SPEED OPTICAL COMMUNICATIONS SYSTEMS

(71) Applicant: ZTE Corporation, Shenzhen, Guangdong (CN)

(72) Inventor: Jianjun Yu, Basking Ridge, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/429,706

(22) Filed: Jun. 3, 2019

(51) Int. Cl.
*H04B 10/50* (2013.01)
*H04B 10/61* (2013.01)

(52) U.S. Cl.
CPC ....... *H04B 10/6165* (2013.01); *H04B 10/613* (2013.01)

(58) Field of Classification Search
CPC .................... H04B 10/50577; H04B 10/50597
See application file for complete search history.

(56) References Cited

U.S. PATENT DOCUMENTS

| 2002/0005975 A1* | 1/2002 | Nakamoto | H04B 10/505 359/254 |
| 2017/0214485 A1* | 7/2017 | Yu | H04B 10/69 |
| 2019/0052046 A1* | 2/2019 | Wang | H04B 10/50 |

OTHER PUBLICATIONS

Kobayashi, T. et al., 35-Tb/s C-band Transmission over 800 km Employing 1-Tb/s PS-64QAM signals enhanced by Complex 8×2 MIMO Equalizer, Optical Fiber Communication Conference, Optical Society of America (Mar. 2019).

\* cited by examiner

*Primary Examiner* — Shi K Li
(74) *Attorney, Agent, or Firm* — Perkins Coie LLP (57) ABSTRACT

Phase imbalance between in-phase (I) and quadrature (Q) components of an optical communications signal causes signal degradation that can result in degraded bit-error rate performance, increased power requirements, and reduced transmission distance. The signal degradation can be expressed as a reduced signal to noise and interference ratio. The disclosed system and techniques monitor the phase imbalance between the I and Q channels and provides for adjustment of the phase of one or more of the I and Q channels to improve overall performance.

16 Claims, 9 Drawing Sheets

700

Generating a first optical signal with a first phase and a second optical signal with a second phase, wherein the first optical signal and the second optical signal correspond to an input signal — 710

Combining the first optical signal and the second optical signal into an output signal, wherein the input signal is selected to cause the output signal to have signal sideband and an image sideband — 720

Adjusting a phase offset added to one or more of the first phase or the second phase to maximize a ratio including the signal sideband and the image sideband — 730

MONITORING AND CORRECTING I/Q IMBALANCE IN HIGH-SPEED OPTICAL COMMUNICATIONS SYSTEMS

TECHNICAL FIELD

This patent document relates to optical communications.

BACKGROUND

There is an ever-growing demand for wired and wireless data throughput including fiber optic communications. The demand on core networks is especially high because not only are user devices such as smartphones and computers using more and more bandwidth due to multimedia applications, but the total number of devices for which data is carried over core networks is increasing. For profitability and to meet the increasing demand, equipment manufacturers and network operators are continually looking for ways in which operational and capital expenditure can be reduced including by improving system performance.

SUMMARY

The present document discloses techniques for monitoring and correcting phase imbalance between I and Q channels of an optical I/Q modulator.

In one aspect, a method of optical digital communication is disclosed. The method includes generating a first optical signal with a first phase and a second optical signal with a second phase, wherein the first optical signal and the second optical signal correspond to an input signal. The method further includes combining the first optical signal and the second optical signal into an output signal, wherein the input signal is selected to cause the output signal to have signal sideband and an image sideband. The method further includes adjusting a phase offset added to one or more of the first phase or the second phase to maximize a ratio including the signal sideband and the image sideband.

In another aspect, an optical communications apparatus is disclosed. The apparatus includes a first optical modulator configured to receive a first voltage signal corresponding to an input signal and generate a first optical signal, and a second optical modulator configured to receive a second voltage signal corresponding to the signal and generate a second optical signal. The apparatus further includes a combiner configured to combine the first optical signal and the second optical signal into an output signal, wherein the input signal is selected to cause the output signal to have a signal sideband and an image sideband. The apparatus further includes a phase shifter configured to adjust a phase offset added to one or more of the first optical signal or the second optical signal to maximize a ratio including the signal sideband and the image sideband signal.

In another aspect, an apparatus includes at least one processor and at least one memory containing instructions that when executed by the at least one processor perform operations including the following. The operations include determining a phase offset value to one or more of an in-phase optical signal or a quadrature optical signal to maximize a ratio including a upper sideband and a lower sideband signal, wherein the in-phase optical signal and the quadrature optical signal correspond to an input signal, wherein the input signal is selected to cause an output signal to be a single-sideband signal including the upper sideband and the lower sideband, and wherein the in-phase optical signal and the quadrature optical signal are configured to be combined into the output signal. The operations further include causing an adjustment to one or more of the in-phase optical signal or the quadrature optical signal according to the determined phase offset value.

These, and other aspects, are disclosed in the present document.

DETAILED DESCRIPTION

Phase imbalance between in-phase (I) and quadrature (Q) components of an optical communications signal causes signal degradation that can result in degraded bit-error rate performance, increased power requirements, and reduced transmission distance. The signal degradation can be expressed as a reduced signal to noise and interference ratio. The disclosed system and techniques monitor the phase imbalance between the I and Q channels and provides for adjustment of the phase of one or more of the I and Q channels to improve overall performance.

Optical communications systems may use any of many different type of modulation of a light source such as a laser. Some illustrative example modulations include on-off keying, various amplitude modulations, and various phase modulation, just to name a few. Many other modulations may also be used for optical communications.

In general, to provide a user or system with a high bit rate or high data rate, a corresponding optical signal provides a high symbol rate. For example, for a symbol rage of $10^{11}$ symbols per second, each symbol occupies only 10 picoseconds (ps). A time offset of 1 ps due to component limitations or path length difference of ~0.02 cm will significantly degrade performance.

Some optical modulations may be implemented using am I/Q modulator. An I/Q modulator has an in-phase (I) channel and a quadrature (Q) channel. For best performance, an I/Q modulator requires matched phase paths which maintains a predetermined phase relationship between the I and Q channels. A phase skew that offsets the predetermined phase relationship between the I and Q channels can degrade system performance which may be expressed as an increased bit-error-rate (BER), reduced transmission distance while maintaining a certain BER, or increased power needed to maintain a certain BER at a certain distance.

The disclosed techniques and system provide for monitoring the phase relationship between the I and Q channels and correction of phase skew between the I and Q channels.

Previous schemes to determining and compensating for I/Q skew, have been based on observing an eye diagram, BER performance at the receiver, and using complex digital signal processing (DSP) to remove the skew after the signal has been received. In contrast, the disclosed techniques and system monitors phase skew and corrects the skew by adjusting the phase of the optical I and Q channels.

Figure 1A:
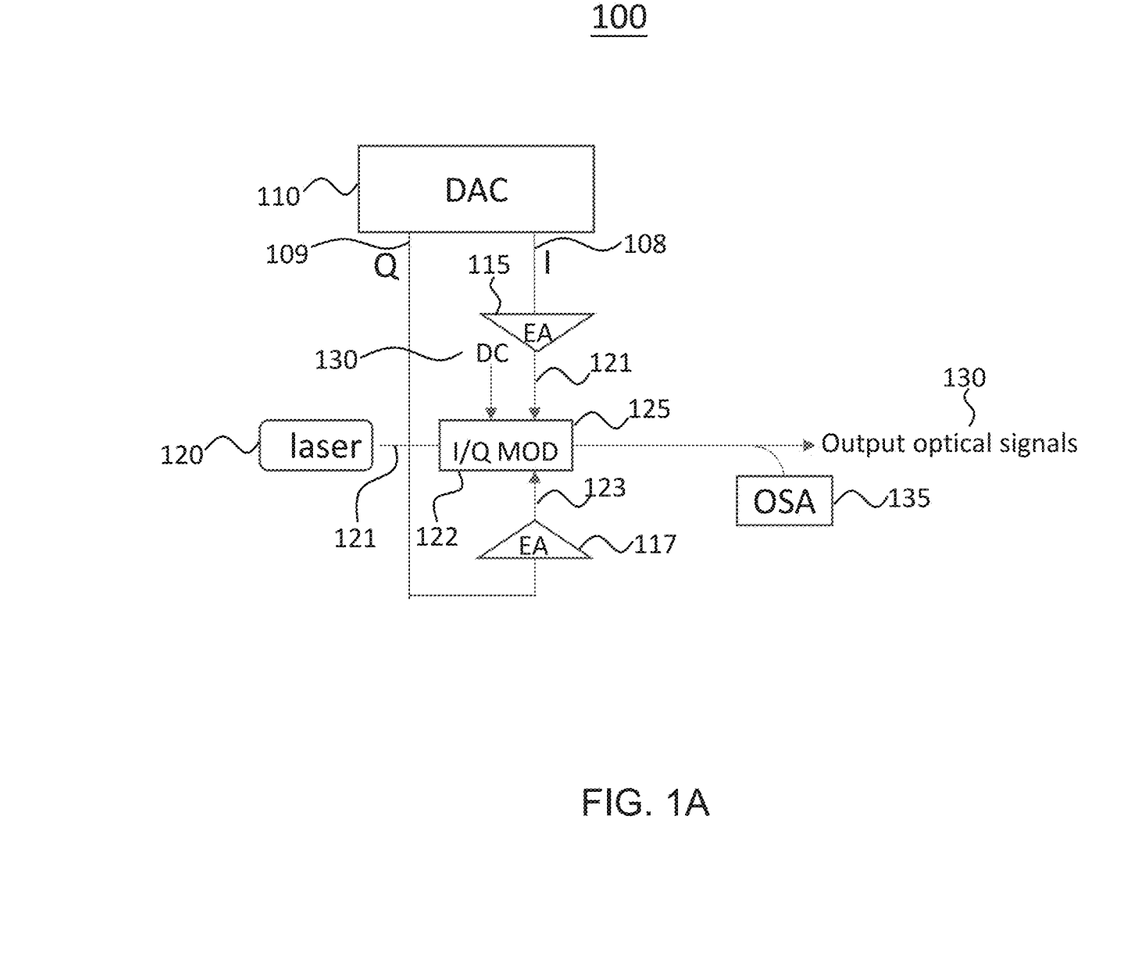
FIG. 1A depicts an example of an optical communication system, in accordance with some example embodiments.

FIG. 1A depicts an optical communications transmitter 100, in accordance with some example embodiments. The transmitter 100 includes a two-channel digital-to-analog (DAC) converter 110 which generates I voltage signal 108 and Q voltage signal 109. Voltage signals 108 and 109 pass through electrical amplifiers 115 and 117, respectively. The electrical amplifiers 115 and 117 may generate larger signals at outputs 121 and 123, may provide filtering of the signals 108 and 109, and/or may attenuate input signals 108 and 109 to provide smaller output signals 121 and 123 that the input signals. Electrical amplifier 115 provides I signal 121 and electrical amplifier 117 provides Q signal 123 to I/Q modulator 125. I/Q modulator 125 receives input light from laser 120 and modulates the light according to the signals 123 and 125 and produces output optical signal 130. A portion of output optical signal 130 may be received by optical spectrum analyzer (OSA) 135. OSA 135 may be replaced by a photodiode, an analog-to-digital converter to digitize the voltage produced by the photodiode, and a digital signal processor to determine an upper single sideband (SSB) amplitude and a lower SSB amplitude which may be used for monitoring and correcting phase imbalance between the I and Q channels.

Figure 1B:
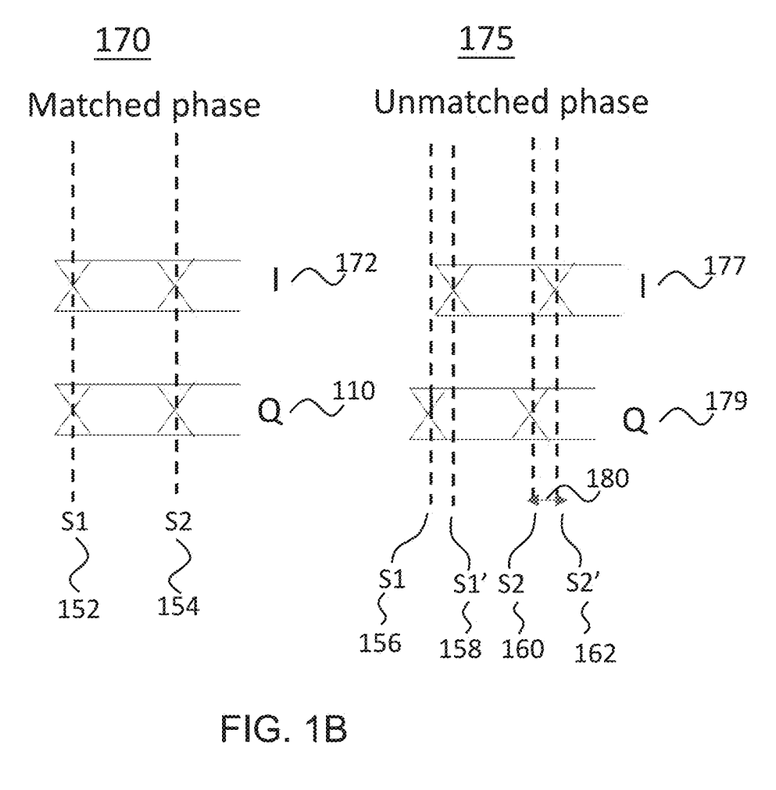
FIG. 1B depicts illustrative examples of signals at where the I channel and Q channel have a correct and incorrect predetermined timing or phase relationship.

FIG. 1B depicts an illustrative example 170 of signals where the I channel and Q channel have a correct predetermined relationship, also referred to as having a matched phase. Illustrative example 175 depicts signals where the I channel and Q channel have an incorrect phase relationship, also referred to as having an unmatched phase.

Illustrative example 170 shows I channel 172 and Q channel 174 at two successive symbol times S1 at 152 and S2 at 154. Illustrative example 170 shows I channel 172 and Q channel 174 aligned at symbol times S1 and S2.

Illustrative example 175 shows I channel 177 and Q channel 179 at two successive symbol times S1 at 156 and S2 at 160. Illustrative example 175 shows I channel 177 and Q channel 179 not aligned at symbol times S1 and S2. Instead, I channel 177 is delayed by time delay 180 from the symbols at Q channel 179. Illustrative example 175 shows an example phase offset that the disclosed techniques and system can correct so that the I and Q channels are corrected to be similar to the alignment shown at 170.

Figure 2:
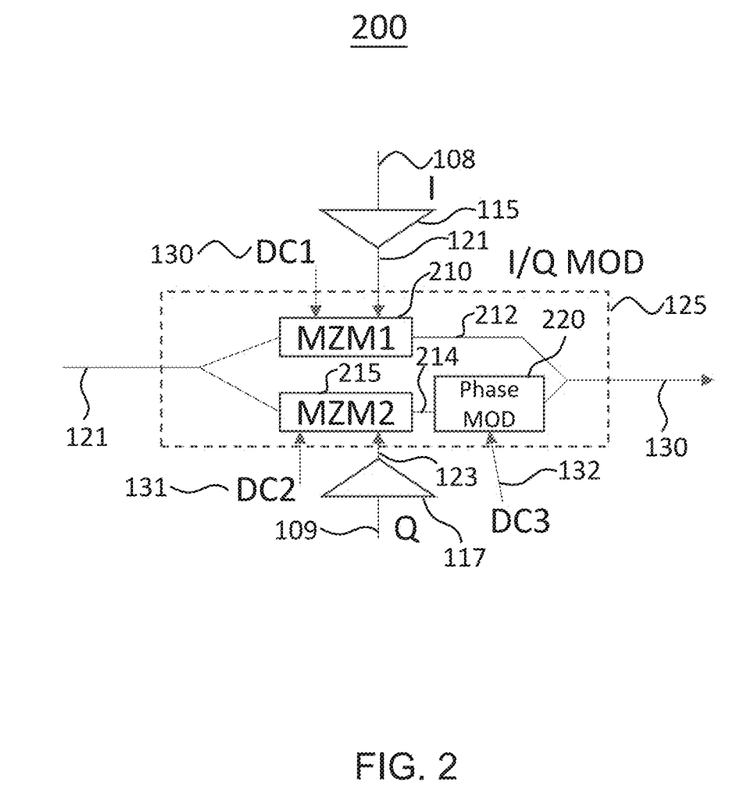
FIG. 2 depicts a portion of the system shown in FIG. 1A with additional detail for the I/Q modulator.

FIG. 2 depicts a portion of the system shown in FIG. 1A with additional detail for the I/Q modulator 125. Shown in FIG. 2 are I voltage signal 108, Q voltage signal 109, electrical amplifiers 115 and 117 which generate I output 121 and Q output 123. I/Q modulator 125 includes Mach-Zehnder modulators 210 and 215 that each modulate a portion of laser light 121 to I modulated light 212 and Q modulated light 214, respectively. Modulators 210 and 215 also have direct current (DC) voltage inputs 130 and 131, respectively. I/Q modulator 125 includes a phase modulator or shifter 220 that can be used to remove phase skew between the I and Q channels. Phase modulator 220 also has a DC input. Phase modulator 220 is shown in FIG. 2 in the signal path of the Q channel but could alternatively be inserted at the output of modulator 210, or two phase modulators similar to 220 can be inserted after each of the modulators 210 and 215. In some example embodiments, the amplitudes of the I and Q channels can be assumed to be the same. DC voltages applied to DC voltage inputs 130 and 131 may be adjusted so that modulators 210 and 215 have the smallest amplitude optical output when the inputs 121 and 123 are turned off. A DC voltage applied to DC voltage input 132 is selected to cause the lightwave phase between modulator 210 and 215 to be a $\pi/2$ phase shift.

Figure 3:
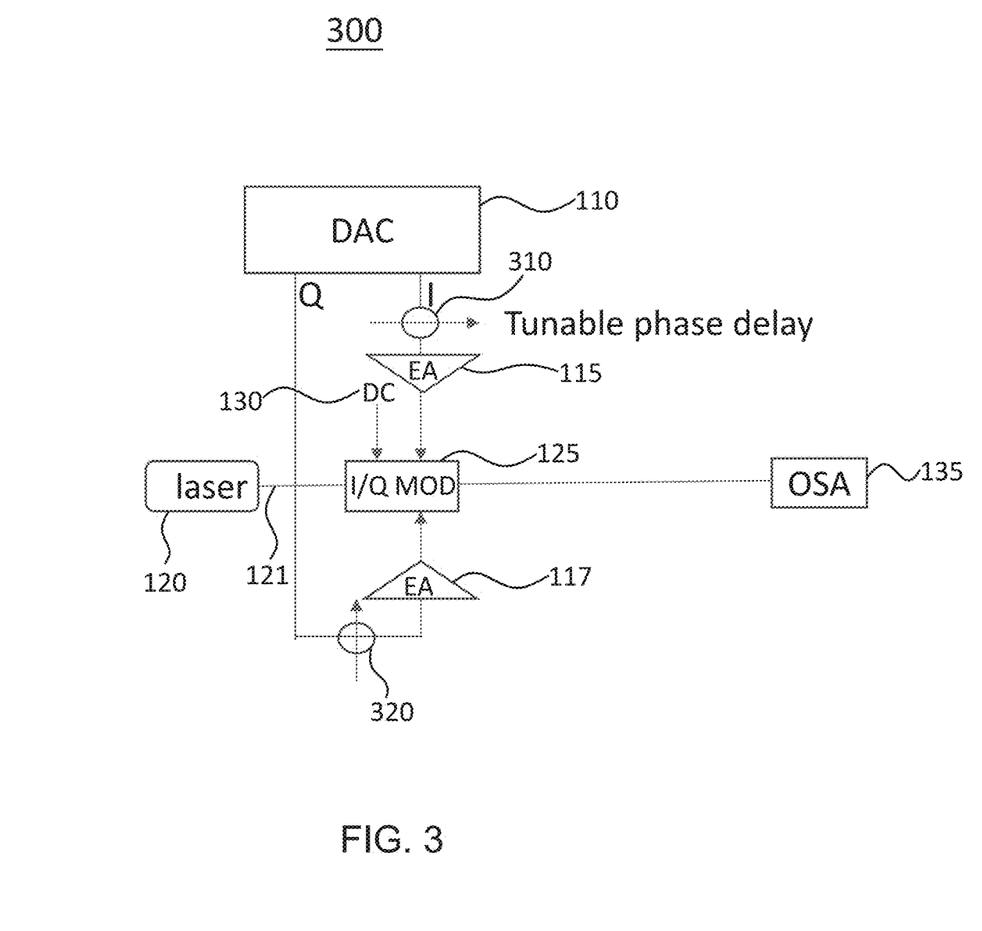
FIG. 3 depicts another example of an optical communications system, in accordance with some example embodiments.

FIG. 3 depicts another optical communications transmitter 300, in accordance with some example embodiments. The transmitter 300 is similar to transmitter 100 in FIG. 1A with the addition of tunable phase delays 310 and 320 inserted in line with the I and Q voltages from the two-channel DAC to amplifiers 115 and 117. One or both tunable phase delays 310 and 320 may be used to adjust the relative phase of one or both of the I and Q channels to cause them to be in alignment.

Figure 4:
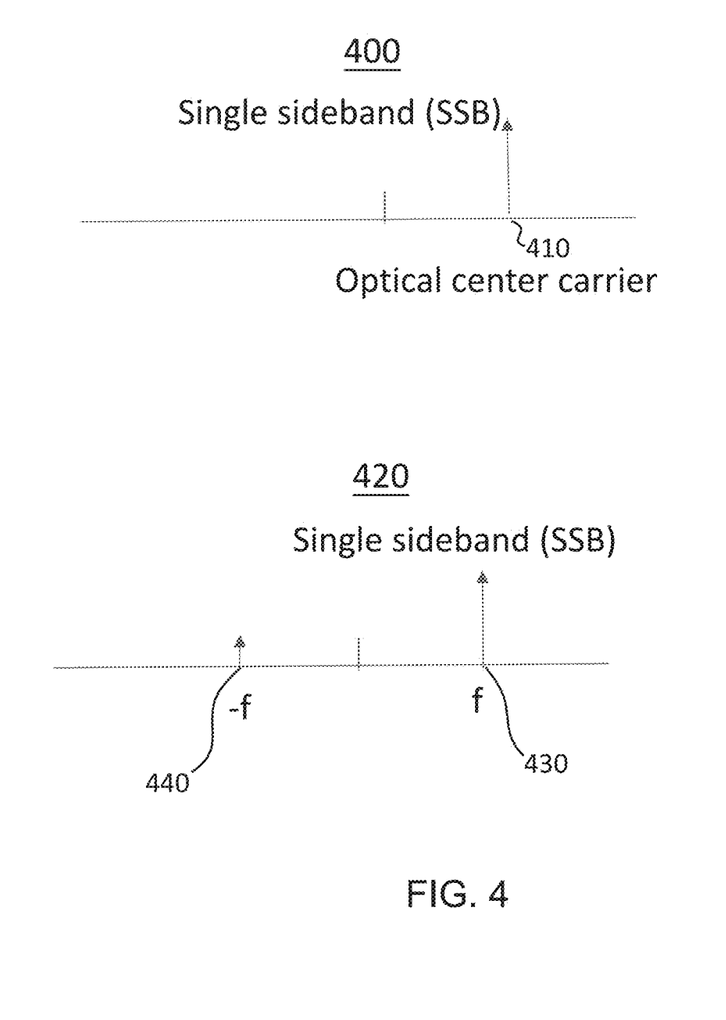
FIG. 4 depicts examples of spectral plots of single sideband signals.

In some example embodiments, executable code executed by a processor or a field-programmable gate array (FPGA) controls a DAC to generate I and Q voltage signals that cause the I/Q optical modulator to generate a SSB optical signal. The voltages driving the I/Q modulator may be expressed as real $(e(i\omega t)) = \cos\omega t$ and the data image $(e(i\omega t)) = \sin\omega t$, where $\omega$ is the angular frequency of the voltage and i is the imaginary unit. If there is no delay between I and Q at the modulator, the signal generated is the SSB as shown in FIG. 4 in spectral plot 400 at 410. If the extinction ratio, which is the ratio of the maximum optical signal out of the I/Q modulator to the minimum possible signal out of the modulator, is not unlimited, a small power is generated at the optical center carrier. FIG. 4 at 400 shows an example spectral plot corresponding to an unlimited extinction ratio.

In some aspects, the operation of the disclosed device is explained below. If the I optical signal and the Q optical signal have a time-shift between the two driving signals, the following shows the result of the time-shift or skew. If the skew time, T, is small, then the following expressions may be applied:

$$\cos(\omega T) = 1, \sin(\omega T) = \omega T \qquad \text{Equation 1}$$

The optical signal at the sideband may be expressed as:

$$\cos(\omega(t+T)) + i\sin(\omega t) = \cos(\omega t)\cos(\omega T) - \sin(\omega t)\sin(\omega T) + i\sin(\omega t) = \cos(\omega t) + i\sin(\omega t) - \omega T\sin(\omega t) = e(i\omega t) - \omega T(e(i\omega t) - e(-i\omega t))/2 = (1 - \omega T/2)e(i\omega t) + \omega T/2 e(-i\omega t), \qquad \text{Equation 2}$$

where i is the common imaginary unit, and e is sometimes referred to as Euler's number.

In addition to a signal at f, where $\omega = 2\pi f$, there will be another signal at $-f$ due to the time delay T. A ratio of the power at f to the power at $-f$ can be expressed as:

$$\omega T/2/(1-\omega T/2) = \omega T/(2-\omega T) \qquad \text{Equation 3}$$

As an illustrative example, when $\omega T = 0.05$, then by Equation 3, the power ratio is 16.9 dB. FIG. 4 at 420 shows an example of a spectral plot showing a spectral line at frequency f at 430 and at frequency $-f$ at 440 with, for example, a power ratio of 16.9 dB or another limited value (non-infinite or very large value).

In some example embodiments, a process is disclosed for monitoring a phase imbalance and correcting the phase imbalance between I and Q channels. A vector signal is generated by the two-channel DAC, the spectrum of the optical signal generated by the I/Q modulator is monitored via OSA or photodiode and processing electronics. For example, the vector signal may be a SSB signal. If a signal is observed at the image frequency of f (a frequency of −f), a tunable time delay is adjusted until the signal at −f is minimized.

In some example embodiments, an optical phase delay device may be removed and the phase adjustment between the I and Q channels needed to minimize the signal at the image frequency may be performed in the digital domain by the processor or FPGA driving the two-channel DAC.

In some example embodiments, when the OSA is replaced by a photodiode, ADC, and signal processing, instead of determining the power at the image frequency (−f), the power at 2f can be determined. If the power at 2f is minimized, the phase between I and Q is matched.

Figure 5:
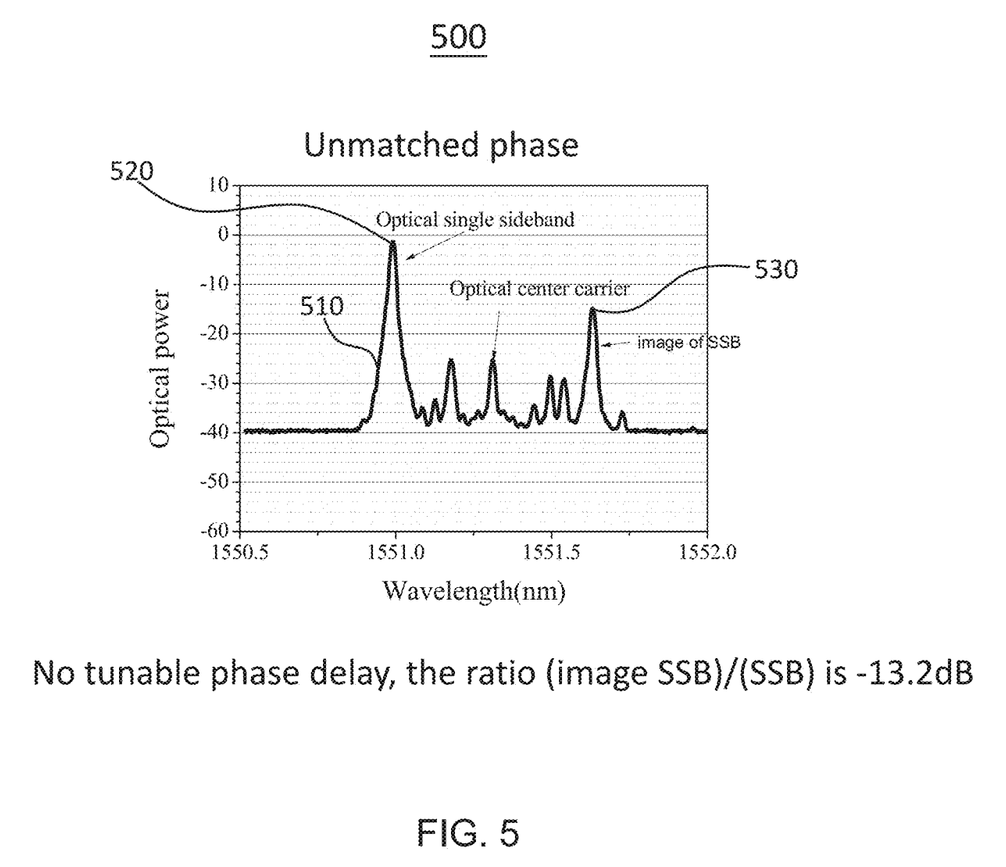
FIG. 5 shows an example of a measured spectral plot for an example system.

FIG. 5 at 500 shows an example of a measured spectral plot for an example system similar to FIGS. 1A and 2 without phase modulator 220 in FIG. 2 or tunable phase delays 310 or 320 in FIG. 3, or the added delay set to zero. As such, no phase adjustment is being made and there is some phase skew between the I and Q channels. In the example of FIG. 5, the desired SSB signal is generated at a frequency of ($f_0$−f) shown at 520, where $f_0$ is the center frequency and −f is the desired SSB frequency. In this example, the lower sideband is the desired frequency and the upper sideband at ($f_0$+f) shown at 530 is the undesired image frequency. The ratio of the power at the image frequency of ($f_0$+f) to the power at the desired SSB frequency of ($f_0$−f) is −13.2 dB.

Figure 6:
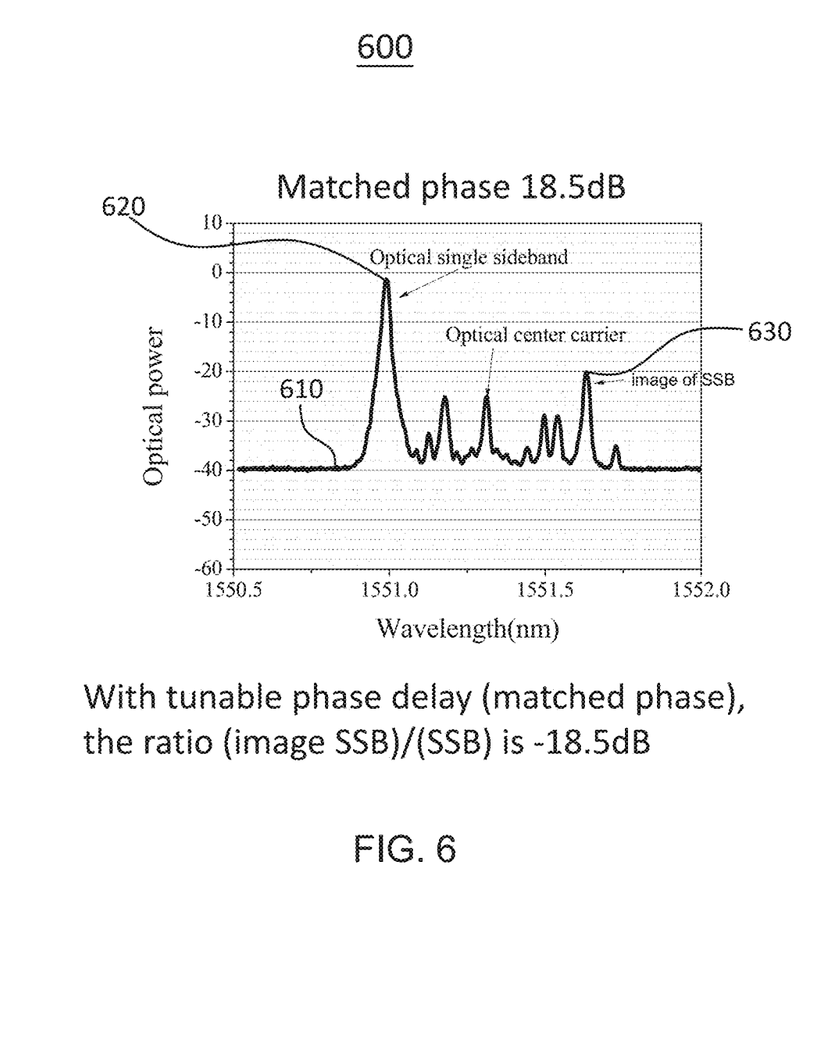
FIG. 6 shows another example of a measured spectral plot for an example system.

FIG. 6 at 600 shows an example of a measured spectral plot for an example system similar to FIGS. 1A and 2 with phase modulator 220 in FIG. 2, or tunable phase delay 310 or 320 in FIG. 3. A phase adjustment is made via 220, 310, and/or 320 to remove the skew between the I and Q channels. In the example of FIG. 6, the desired SSB signal is generated at a frequency of ($f_0$−f) shown at 620, where $f_0$ is the center frequency and −f is the desired SSB frequency. In this example, the lower sideband is the desired frequency and the upper sideband at ($f_0$+f) shown at 630 is the undesired image frequency. The ratio of the power at the image frequency of ($f_0$+f) at 630 to the power at the desired SSB frequency of ($f_0$−f) at 620 is −18.5 dB.

Figure 7:
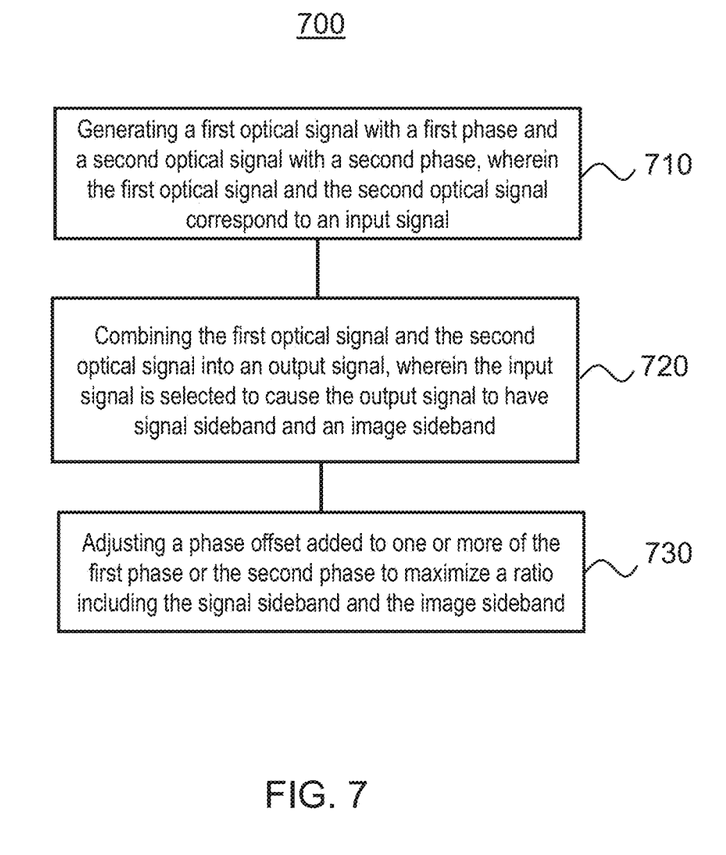
FIG. 7 depicts an example of a process, in accordance with some example embodiments.

FIG. 7 depicts a process 700, in accordance with some example embodiments. The process 700 may be implemented by an optical transmitter such as described with reference to FIG. 1A and further described in FIG. 8.

At 710, the process 700 includes generating a first optical signal with a first phase and a second optical signal with a second phase, wherein the first optical signal and the second optical signal correspond to an input signal. In some embodiments, the generating operation may be performed by a first Mach-Zehnder modulator, wherein an in-phase voltage signal is generated by a first digital-to-analog converter (DAC), wherein the in-phase voltage signal controls the first Mach-Zehnder modulator to generate the first optical signal, wherein the generating the second optical signal is performed by a second Mach-Zehnder modulator, wherein a quadrature voltage signal is generated by a second DAC, and wherein the quadrature voltage signal controls the second Mach-Zehnder modulator to generate the second optical signal. For example, configurations discussed with reference to FIG. 1A, 1B, 2 or 3 may be used.

At 720, the process includes combining the first optical signal and the second optical signal into an output signal, wherein the input signal is selected to cause the output signal to have signal sideband and an image sideband.

At 730, the process includes adjusting a phase offset added to one or more of the first phase or the second phase to maximize a ratio including the signal sideband and the image sideband. The process 700 may include other features described above with respect to FIGS. 1A-6.

In some embodiments, the phase offset adjustment 730 to one or more of the first optical signal or the second optical signal is performed by an optical phase shifter included in a signal path after the first Mach-Zehnder modulator or the second Mach-Zehnder modulator and before the combining. In some embodiments, the phase offsetting operation is performed digitally and is included in a digital bit stream provided to the first DAC or the second DAC. The phase offset value for the phase offset is determined by the ratio including the signal sideband and the image sideband.

For example, in some embodiments the first optical signal is generated by an in-phase (I) modulator of an I/Q modulator, wherein the second optical signal is generated by a quadrature modulator of the I/Q modulator, and wherein the signal sideband is a single sideband and the image sideband is an image of the single sideband. In some embodiments, the ratio is of a first amplitude of the signal sideband to a second amplitude of the image sideband. In some embodiments, the ratio is a second amplitude of the image sideband to a first amplitude of the signal sideband.

Figure 8:
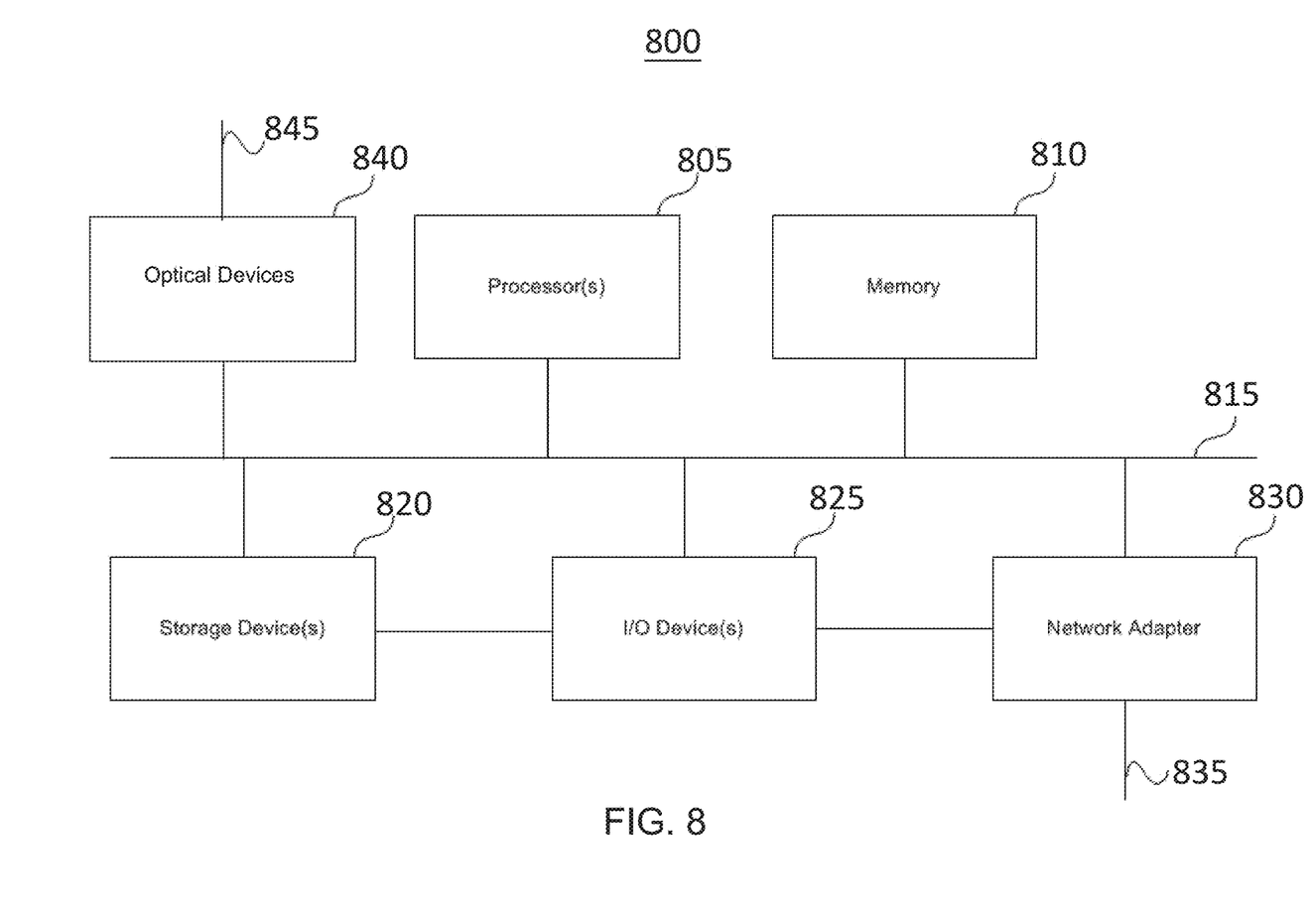
FIG. 8 depicts an example of an apparatus, in accordance with some example embodiments.

FIG. 8 depicts an apparatus, in accordance with some example embodiments. An optical communications system such as described in FIGS. 1A-6 may include an apparatus such as 800. In an optical communications system, apparatus 800 may perform one or more of the processes described with respect to FIGS. 1A-7. Apparatus 800 may also perform other status and control functions and include interfaces to other devices. FIG. 8 at 800 is a block diagram of a computing and communications system, consistent with various embodiments such as shown in FIGS. 1A-7 described above.

The apparatus 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. Apparatus 800 may further include optical devices 840 including one or more of lasers, detectors, amplifiers, modulators, optical and electrical phase shifters, and other optical and optoelectronic components. Optical devices 840 may connect to one or more fibers 845 that connect to an I/Q modulator. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an IEEE standard 1394 bus, also called "Firewire".

The memory 810 and storage devices 820 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 810 can be implemented as software and/or firmware to program the processor(s) 805 to carry out actions described above. In some embodiments, such software or firmware may be initially provided to the processing system 800 by downloading it from a remote system through the computing system 800 (e.g., via network adapter 830 or optical devices 840).

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

The disclosed and other embodiments, modules and the functional operations described in this document can be implemented using optical components and in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, comprising:
   generating a first optical signal with a first phase and a second optical signal with a second phase, wherein the first optical signal and the second optical signal correspond to an input signal;
   combining the first optical signal and the second optical signal into an output signal, wherein the input signal is selected to cause the output signal to have signal sideband and an image sideband; and
   adjusting a phase offset added to one or more of the first phase or the second phase to maximize a ratio including the signal sideband and the image sideband.

2. The method of claim 1, wherein the first optical signal is generated by an in-phase (I) modulator of an I/Q modulator, wherein the second optical signal is generated by a quadrature modulator of the I/Q modulator, and wherein the signal sideband is a single sideband and the image sideband is an image of the single sideband.

3. The method of claim 1, wherein the ratio is of a first amplitude of the signal sideband to a second amplitude of the image sideband.

4. The method of claim 1, wherein the ratio is a second amplitude of the image sideband to a first amplitude of the signal sideband.

5. The method of claim 1, wherein the generating the first optical signal is performed by a first Mach-Zehnder modulator, wherein an in-phase voltage signal is generated by a first digital-to-analog converter (DAC), wherein the in-phase voltage signal controls the first Mach-Zehnder modulator to generate the first optical signal, wherein the generating the second optical signal is performed by a second Mach-Zehnder modulator, wherein a quadrature voltage signal is generated by a second DAC, and wherein the quadrature voltage signal controls the second Mach-Zehnder modulator to generate the second optical signal.

6. The method of claim 5, wherein the phase offset to one or more of the first optical signal or the second optical signal is performed by an optical phase shifter included in a signal path after the first Mach-Zehnder modulator or the second Mach-Zehnder modulator and before the combining.

7. The method of claim 5, wherein the phase offset is performed digitally and is included in a digital bit stream provided to the first DAC or the second DAC.

8. The method of claim 1, wherein a phase offset value for the phase offset is determined by the ratio including the signal sideband and the image sideband.

9. An optical communications apparatus, comprising:
   a first optical modulator configured to receive a first voltage signal corresponding to an input signal and generate a first optical signal, and a second optical modulator configured to receive a second voltage signal corresponding to the signal and generate a second optical signal;
   a combiner configured to combine the first optical signal and the second optical signal into an output signal, wherein the input signal is selected to cause the output signal to have a signal sideband and an image sideband; and
   a phase shifter configured to adjust a phase offset added to one or more of the first optical signal or the second optical signal to maximize a ratio including the signal sideband and the image sideband signal.

10. The optical communications apparatus of claim 9, wherein the first optical modulator is an in-phase (I) modulator of an I/Q modulator, wherein the second optical modulator is a quadrature modulator of the I/Q modulator, and wherein the signal sideband is a single sideband and the image sideband is an image of the single sideband.

11. The optical communications apparatus of claim 9, wherein the ratio is a first amplitude of the signal sideband to a second amplitude of the image sideband.

12. The optical communications apparatus of claim 9, wherein the ratio is a second amplitude of the image sideband to a first amplitude of the signal sideband.

13. The optical communications apparatus of claim 9, wherein the first optical signal is generated by a first Mach-Zehnder modulator, wherein an in-phase voltage signal is generated by a first digital-to-analog converter (DAC), wherein the in-phase voltage signal controls the first Mach-Zehnder modulator to generate the first optical signal, wherein the second optical signal is generated by a second Mach-Zehnder modulator, wherein a quadrature voltage signal is generated by a second DAC, and wherein the quadrature voltage signal controls the second Mach-Zehnder modulator to generate the second optical signal.

14. The optical communications apparatus of claim 13, wherein the phase offset to one or more of the first optical signal or the second optical signal is performed by an optical phase shifter included in a signal path after the first Mach-Zehnder modulator or the second Mach-Zehnder modulator and before the combining.

15. The optical communications apparatus of claim 13, wherein the phase offset is performed digitally and is included in a digital bit stream provided to the first DAC or the second DAC.

16. The optical communications apparatus of claim 9, wherein a phase offset is determined by the ratio including the signal sideband and the image sideband.

* * * * *